United States Patent [19]
Vogel

[11] Patent Number: 5,511,629
[45] Date of Patent: Apr. 30, 1996

[54] MOTOR VEHICLE STEERING SYSTEM

[75] Inventor: Thomas Vogel, Kempten, Germany

[73] Assignee: Daimler-Benz AG, Germany

[21] Appl. No.: 187,508

[22] Filed: Jan. 28, 1994

[30] Foreign Application Priority Data

Feb. 16, 1993 [DE] Germany .......................... 43 04 664.9

[51] Int. Cl.[6] .............................. B62D 5/00; B62D 6/00; B62D 7/00; B62D 3/02
[52] U.S. Cl. ........................ 180/79.3; 180/133; 180/79.1
[58] Field of Search .................................. 180/79.1, 79.3, 180/133

[56] References Cited

U.S. PATENT DOCUMENTS

| | | |
|---|---|---|
| 3,073,407 | 1/1963 | Yates et al. . |
| 4,437,531 | 3/1984 | Urabe ..................................... 180/79.1 |
| 4,860,844 | 8/1989 | O'Neil .................................... 180/79.1 |
| 4,865,144 | 9/1989 | North ..................................... 180/79.1 |
| 4,984,646 | 1/1991 | Sano et al. ............................. 180/79.1 |
| 5,205,371 | 4/1993 | Karnopp .................................. 180/79.1 |
| 5,226,498 | 7/1993 | Gutkowski et al. ................... 180/79.1 |
| 5,236,335 | 8/1993 | Takeuchi et al. ........................ 180/133 |

FOREIGN PATENT DOCUMENTS

| | | |
|---|---|---|
| 0447626 | 9/1991 | European Pat. Off. . |
| 3809192 | 9/1988 | Germany .............................. 180/133 |
| 3830654 | 11/1989 | Germany . |
| 297659 | 9/1928 | United Kingdom . |
| 2204006 | 11/1988 | United Kingdom ................... 180/133 |

Primary Examiner—Mitchell J. Hill
Attorney, Agent, or Firm—Evenson, McKeown, Edwards & Lenahan

[57] ABSTRACT

A control appliance for a motor vehicle steering system provides automatic control intervention (or steering intervention) without corresponding movement of the steering wheel. To this end, the drive connection between the steering wheel and the steered vehicle wheels can, in effect, be separated. The automatic control can be either a closed-loop control or an open-loop control.

7 Claims, 3 Drawing Sheets

MOTOR VEHICLE STEERING SYSTEM

BACKGROUND AND SUMMARY OF THE INVENTION

The present invention relates to a control appliance, in particular a steering system for motor vehicles, having a manually actuated handling device, such as a steering wheel, and control elements, such as steered wheels, connected thereto by a drive connection, and having a motorized drive appliance which is selectively connected to the control elements, which can be automatically controlled in either an open-loop or closed-loop manner and which permits the control elements to be actuated autonomously.

U.S. Pat. No. 3,073,407 describes a motor vehicle steering system which operates fully automatically during certain manoeuvres for parking the motor vehicle because a motorized drive appliance with automatic control actuates the steering system. In this system, the steering wheel also rotates to correspond with the particular steering manoeuvres, i.e. the driver can "observe" how the steering operates.

In addition, it is known that motor vehicles, in particular passenger cars, can have the vehicle steering system configured such that under certain driving conditions, particularly with side-wind perturbations by way of example, an automatic steering intervention takes place in order to stabilize the vehicle. In order to avoid the driver being irritated or disturbed by the automatic steering intervention, an automatically operating rear-wheel steering system is usually provided, whereas the steering system actuated by the driver acts on the front wheels. The automatic steering intervention can therefore take place without the driver feeling any motions or forces at the steering wheel, with the exception of the particular steering forces and motions caused by road effects. It is, however, also fundamentally known to undertake automatic steering interventions by way of the front wheels alone or additionally. The driver can, however, be annoyed when the steering wheel is also moved by the automatic steering intervention.

A so-called derivative steering system is described in DE 38 30 654 A1. The characteristic feature of this system is that the transmission ratio between the setting motion of the steering wheel and the change in steering angle of the steered wheels caused thereby changes as a function of the setting rate of the steering wheel. The steering wheel drives via an input shaft, for this purpose, the sun wheel of an epicyclic gear configured as a differential gear. An output shaft torsionally connected to the internal teeth gearwheel or ring gearwheel of this gear controls the vehicle steered wheels. A motor controlled by an automatic closed-loop control appliance drives a spindle which forms a second input to the epicyclic gear and is in engagement with the planet carrier, which has external teeth. The transmission ratio between the input shaft and the output shaft is correspondingly determined by the rotational direction and the rotational speed of the motor. If the steering wheel or the input shaft is kept at rest, the steering angle of the vehicle steered wheels does not change, as is typical of a derivative steering system.

A control system, provided particularly for heavy road rollers, is described in GB-A 297 659 and permits switching between two types of operation. In one type of operation, the steering wheel acts directly and without any motorized support on the steering elements of the vehicle, usually a steerable roller. The steering wheel is then mechanically drive-connected to the steering elements. In the other type of operation, the direct mechanical connection between the steering wheel and the steering elements is separated because a claw coupling provided for this purpose takes up its open state in this type of operation. At the same time, the steering wheel controls a control coupling which connects a continuously running drive motor in different ways to the control elements such that, depending on the rotational direction of the steering wheel, the control elements are adjusted in one direction when the steering wheel is actuated in one rotational direction and are adjusted in the opposite direction when the steering wheel is actuated in the other rotational direction.

An object of the present invention is to provide a novel control system of the aforementioned type with, on one hand, the highest safety requirements being satisfied, and, on the other hand, irritation or annoyance of the operating personnel or the driver and incorrect manoeuvres caused thereby being avoided as far as possible.

This object has been achieved according to the present invention, by providing that a permanently effective positive connection between an input part and an output part of the drive connection can, in effect, be separated. The drive appliance actively adjusts the output part or subjects it to a torque and, while overcoming a self-locking device, effects a disconnection, which is prevented by the self-locking device when the drive appliance is separated from its energy supply, of the input part from the output part.

The present invention therefore provides that the handling device or the steering wheel is in a continually effective connection with the control elements (or steered wheels) by way of the positive connection, which is preferably configured as a permanently effective mechanical through-connection between the input part and the output part. The drive connection between the handling device or steering wheel and the control elements or steered wheels is only apparently separated in the case of automatic control or steering interventions.

This arrangement, on the one hand, gives the operating personnel or the driver "dominance" over the control or steering system. When the energy supply to the drive appliance is shut off, on the other hand, the operating behavior of a conventional control or steering system, i.e. a system without automatic control or steering intervention is provided immediately.

In accordance with a first advantageous embodiment of the invention, it is possible to provide that the input part and the output part are positively drive-connected by a sliding clutch or the like, which is expediently configured so that the forces and torques exerted on the control system or the steering system by the operating personnel or by the driver during normal operating phases can be readily transmitted. Furthermore, the input part and the output part are each provided with an automatically controllable drive which is not self-locking and by way of which the automatic control or steering intervention then takes place when required.

It is then expedient for the drive connected to the output part to effect control manoeuvres or steering manoeuvres whereas the drive acting on the input part holds it completely or almost at rest. For example, it is therefore advantageously possible to achieve the effect that the operating personnel or the driver notices the automatic control or steering intervention on the handling device or on the steering wheel by more or less slight reactions or motions of the handling device or of the steering wheel without, however, becoming uneasy or irritated by excessively strong reactions or motions, such as occur in the case of motion of the handling device or of the steering wheel corresponding to the particular control or steering intervention.

In a second advantageous embodiment of the invention, the input part and the output part are connected together by a self-locking motorized drive. Furthermore, a motorized drive which is not self-locking is arranged on the input part and/or on the output part. An automatic control or steering intervention, in which the handling device or the steering wheel remain substantially at rest or execute markedly reduced motions compared with the particular control or steering intervention, can then again take place by appropriate automatic actuation of the self-locking motorized drive and the drive, which is not self-locking, on the input part and/or on the output part.

When the drives are separated from their energy supply in this second embodiment, the input part and the output part can be positively connected together in a practically rigid manner via the self-locking drive which can be configured as a travelling wave electric motor to behave mechanically like a sliding clutch, and a non-self-locking motor which is connected in parallel therewith.

In an advantageous third embodiment of the present invention, a superimposed gear provided with two inputs and one output is arranged between the input part and the output part. One input of the superimposed gear is positively connected to the input part, its output is positively connected to the output part and its extra input is movable, via a motor, relative to a stationary part. The extra input is held stationary by the self-locking nature of the motor or gear parts connected thereto when the motor is separated from its energy supply. In addition, the input part and/or the output part is provided with a motorized drive which is not self-locking.

Here again, a control or steering intervention, in which the handling device or the steering wheel are not moved in a motorized fashion or are moved in a motorized fashion in a manner independent in principle from the control or steering intervention, can take place by appropriate control of the drives in this third embodiment.

In both the second and the third embodiment of the present invention, the arrangement of non-self-locking motorized drives on the output part and on the input part permit a mode of operation in which the self-locking drive between the input part and the output part and the motorized drive on the second input of the superimposed gear only have to overcome the resistance of the self-locking device. The two non-self-locking drives undertake the control or steering intervention and the motion or stationary condition of the handling device or the steering wheel which are, in effect, decoupled from the control or steering intervention.

A very high level of safety is provided by the three embodiments of the present invention because the handling device or the steering wheel remain in continuous drive connection with the control elements. Consequently, the operating personnel or the driver have the continuous possibility of manual intervention. Moreover, the automatic control of the drives need only continually check for fault-free behavior and need only separate the drives from the energy supply when a fault occurs. Conventional control or steering is then immediately available without the possibility of automatic intervention. Furthermore, emergency operation is still fundamentally possible when a drive fails.

BRIEF DESCRIPTION OF THE DRAWINGS

These and other objects, features and advantages of the present invention will become more readily apparent from the following detailed description thereof when taken in conjunction with the accompanying drawings herein.

DETAILED DESCRIPTION OF THE DRAWINGS

Figure 1:
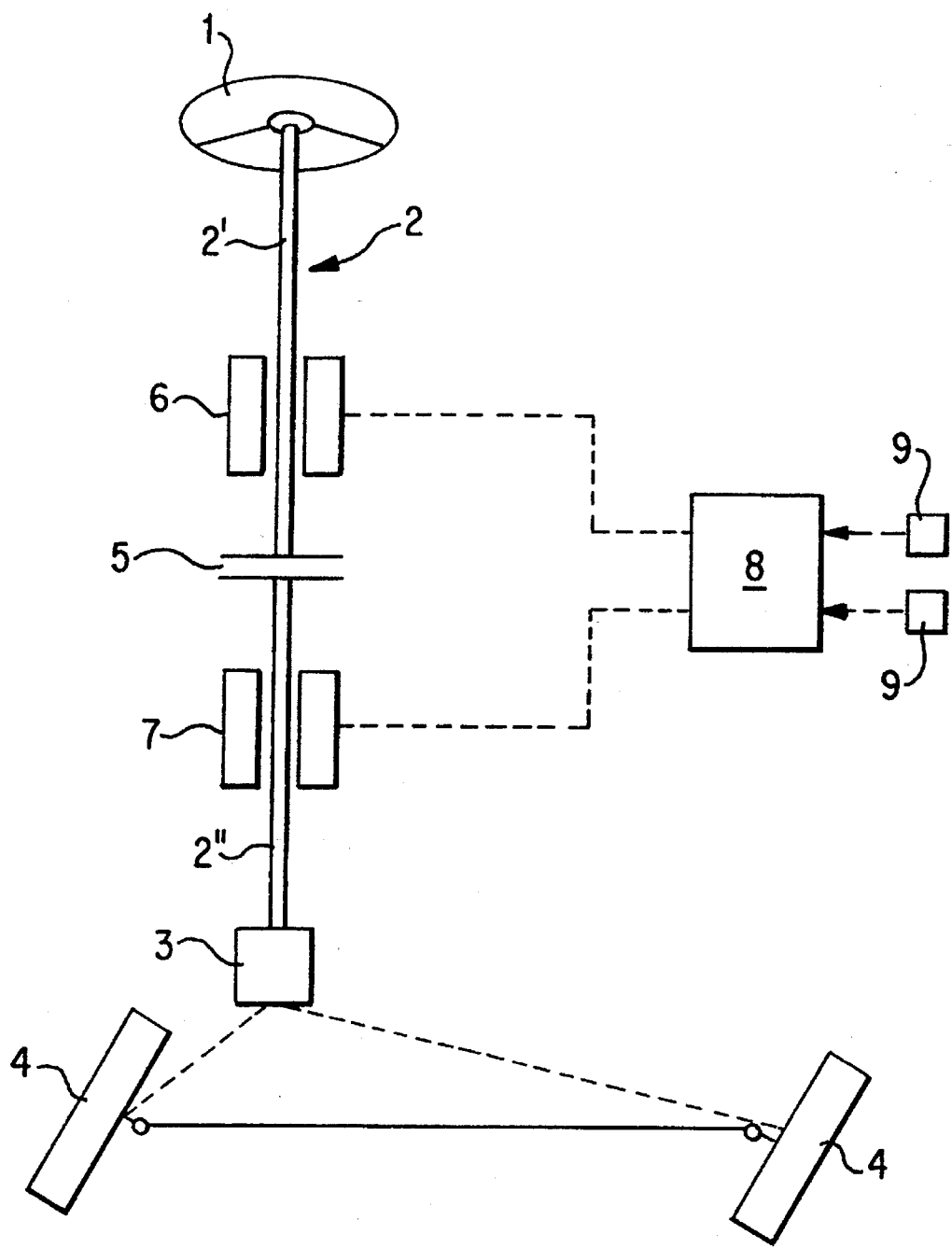
FIG. 1 is a schematic view of a vehicle steering system in accordance with a first embodiment of the present invention.

In the steering system of a particular vehicle shown in FIG. 1, a steering wheel 1 is mechanically drive-connected by a steering column 2 to a steering gear 3 which is, in turn, connected in a conventional manner to the front steered wheels 4 of the particular vehicle so that when the steering wheel 1 is rotated to the right or the left, the steered wheels 4 are deflected to the right or the left.

The present invention consists, in the embodiment shown in FIG. 1, in the steering column 2 being subdivided into an input part 2' and an output part 2", and the input part 2' and output part 2" being drive-connected to one another by a sliding clutch 5. The sliding clutch 5 is constructed such that steering torques occurring during driving operation of the vehicle can be transmitted by the steering column 2 between the steering wheel 1 and the steering gear 3 without the sliding clutch 5 slipping.

Electrical drives 6 and 7, which are not self-locking, are preferably respectively arranged on both the input part 2' and the output part 2". As long as these drives 6, 7 are separated from their energy supply, the steering system shown behaves in the conventional manner, i.e. the steered wheels 4 are exclusively deflected to correspond with the setting motion of the steering wheel 1.

The drives 6, 7 are actuated by an automatic control system 8 and as a function of parameters which can be specified, for example side-wind perturbations. Sensors 9 connected to the input end of the control system 8 are provided for determining these side-wind perturbations. The sensors 9 and the control system 8 typically operate electrically or electronically.

The control system 8 can activate the drives 6, 7 as a function of the specified parameters so that the drive 7 associated with the output part 2" effects a desired steering motion of the steered wheels 4 of the vehicle, whereas the drive 6 associated with the input part 2' holds the input part 2' and the steering wheel 1 at rest, or moves it in a similar manner to the output part 2" but with a clearly reduced rotational displacement. The torques which can be generated by the drives 6 and 7 must, of course, be large enough to cause the sliding clutch 5 to slip. In the above-mentioned control system, the steered wheel angle and the steered wheel torque can, fundamentally, be adjusted separately from one another.

The control system 8 continually checks itself for malfunctions. In the event of a malfunction, the drives 6 and 7 are separated from their energy supply so that the drives 6 and 7 remain continually ineffective and, because they are not self-locking, they exert no influence of any type on the steering. Because the drives 6, 7 are never self-locking even in the case of fault-free functioning of the control system 8 and can only act on the input part 2' and the output part 2" by way of a torque, a steering intervention by the driver remains continually possible because, when the steering wheel 1 is actuated by the driver, an additional torque is transmitted from the input part 2' via the sliding clutch 5 to the output part 2" in each case and a corresponding additional steering deflection of the steered wheels 4 takes place.

If one of the drives 6, 7 should fail, an automatic steering intervention still remains possible if the respectively remaining drive 6 or 7 is correspondingly activated by the control system 8. In this emergency operation, however, it must be accepted that the input part 2' and the output part 2" will execute rotary motions of equal magnitude, i.e the steering wheel 1 will execute correspondingly large rotary motions.

Figure 2:
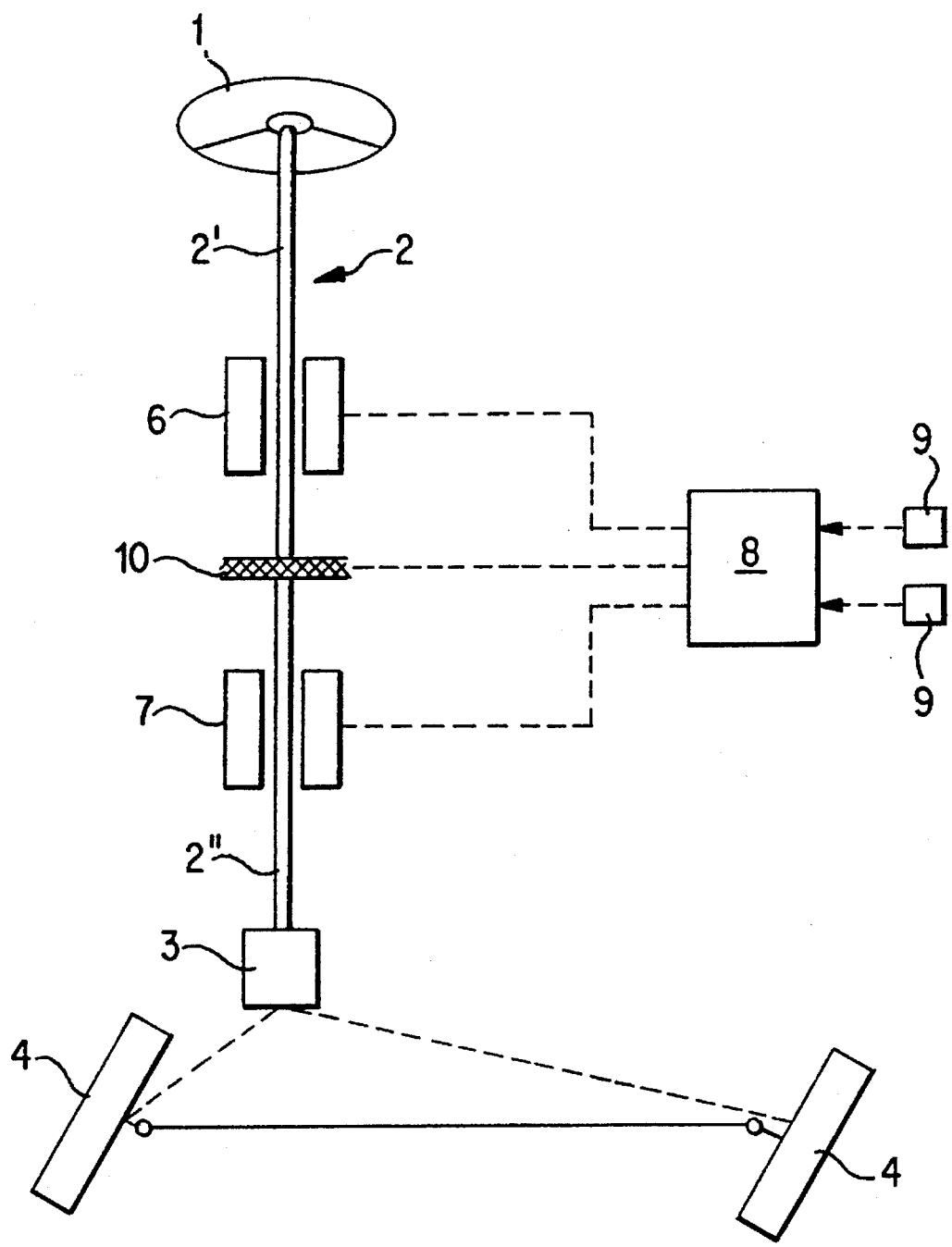
FIG. 2 is a schematic view similar to FIG. 1, but of a second embodiment.

The embodiment shown in FIG. 2 differs from that of FIG. 1 essentially in the fact that one of the drives 6 or 7 which are not self-locking is, if necessary, omitted and the sliding clutch 5 in FIG. 1 is replaced by a self-locking drive arranged between the input part 2' and the output part 2". The self-locking drive 10 can, for example, be configured as a travelling wave electric motor which behaves like a sliding clutch in the electrically currentless condition and, when connected to an electrical current source, generates a torque in one or the other direction, depending on the polarity, between the input part 2' and the output part 2".

By appropriately activating one of the drives 6 or 7 and the drive 10, it is therefore again possible to achieve the effect that the input part 2' and the output part 2" execute different rotary motions. The input part 2' can also, if necessary, be held at rest. An automatic steering intervention with a steering wheel 1 which remains essentially at rest is therefore again possible.

If both the drives 6, 7 which are not self-locking are present, the self-locking drive 10 is only activated, in the case of an automatic steering intervention, so that compensation is provided for the self-locking and the drives 6, 7 therefore need only generate a torque which can be felt at the steering wheel 1, on the one hand, and a torque which is desired at the input end of the steering gear 3, on the other hand. The drives 6, 7 can, in this way, be controlled with particular sensitivity because the motions of the input part 2' and the output part 2" have practically no reactions on one another.

If necessary, an automatic steering intervention is still possible even if only one of the drives 6, 7 and 10 is still available. If only one of the drives 6, 7 is operational, an automatic steering intervention can take place in the same way as has been explained in the case of the embodiment of FIG. 1.

If only the self-locking drive 10 is still available, a relative rotation can be effected between the input part 2' and the output part 2". Assuming that the driver keeps the steering wheel 1 essentially at rest, a steering deflection of the steered wheels 4 then takes place which is effected by the drive 10.

As soon as the drives 6, 7 and 10 are separated from their energy supply because, for example, the control system 8 has found a faulty function, the steering system represented immediately behaves like a conventional steering system without the possibility of an automatic steering intervention.

Figure 3:
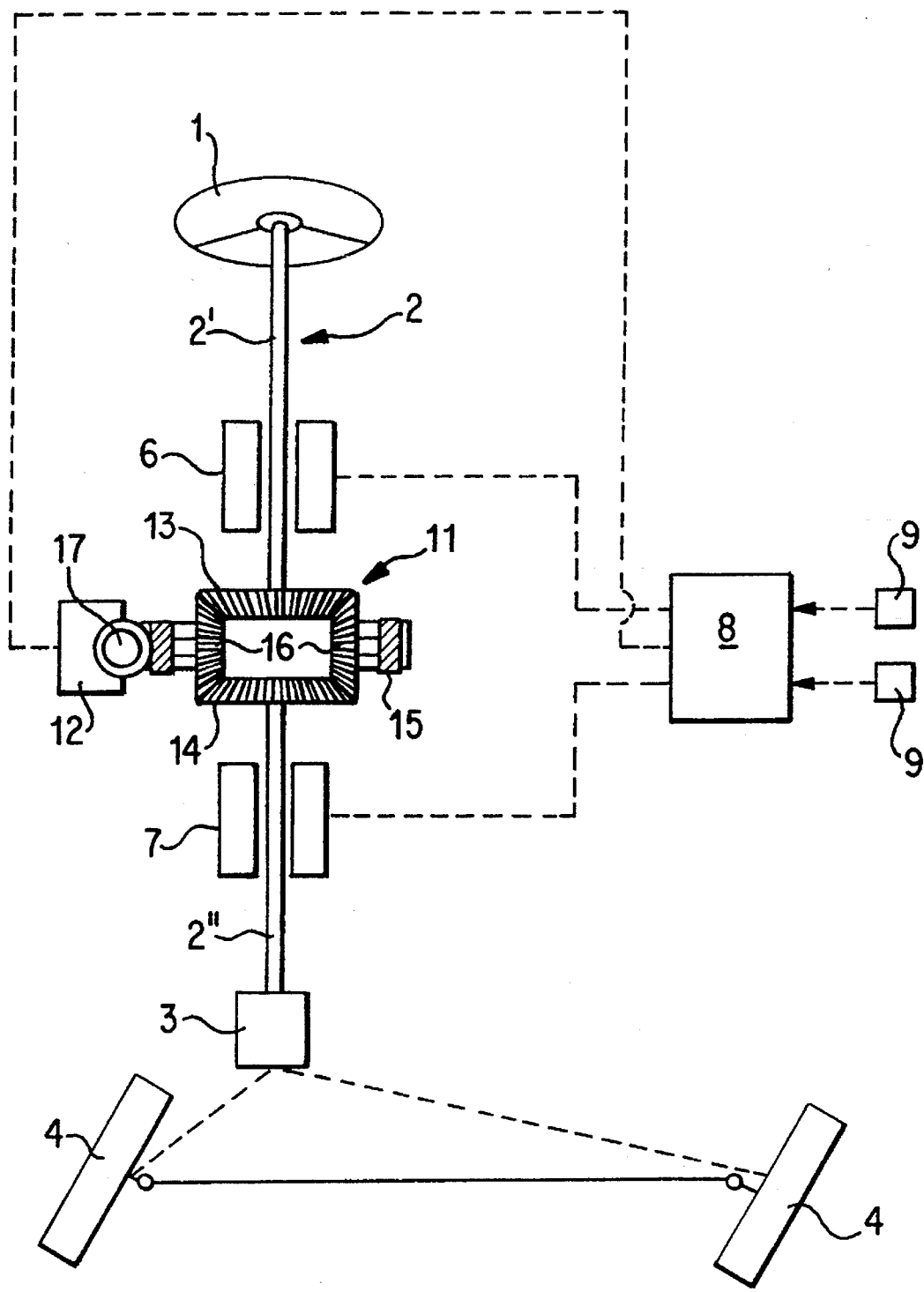
FIG. 3 is a corresponding schematic view of a third embodiment.

In the embodiment of FIG. 3, one of the drives 6, 7 which is not self-locking can again be omitted. A superimposed gear 11 is arranged between the input part 2' and the output part 2", one input of this superimposed gear 11 being connected to the input part 2' and its output being connected to the output part 2". A second input of the superimposed gear 11 is drive-connected to a drive 12, for example an electric motor, which permits the second input to move relative to the stationary parts of the vehicle. The drive 12 and/or the gear parts have a self-locking configuration so that when the drive 12 is separated from its energy supply, the second input remains continually at rest.

The superimposed gear 11 has a bevel gearwheel 13, arranged so that it rotates with the input part 2', and a bevel gearwheel 14, likewise arranged so that it rotates with the output part 2". A toothed ring 15 with external teeth is arranged between the mutually coaxial bevel gearwheels 13, 14 and this toothed ring 15 holds, on its inner periphery, small bevel gearwheels 16 which can rotate relative to the toothed ring 15 and engage with the bevel gearwheels 13 and 14. The external teeth of the toothed ring 15 interact with a worm 17 driven by the drive 12. The inclination of the worm 17 is so small that there is marked self-locking between the worm 17 and the toothed ring 15. The drive 12 which drives the worm 17 is supported in a stationary manner.

The rotary motion of the output part 2" is determined by the sum of the rotary motions of the input part 2' and the worm 17. When the worm 17 is kept at rest, the output part 2" executes a rotary motion which is of the same magnitude as that of the input part 2' but in the reverse direction. This reversal of direction must be taken into account, in the design of the steering gear 3, such that, as long as the worm 17 is at rest, a rotation of the steering wheel 1 to the left or right respectively effects a steering deflection of the steered wheels 4 to the left or right.

An automatic steering intervention can take place, by corresponding activation of one of the drives 6 and 7 and of the drive 12, in which the input part 2', and also therefore the steering wheel 1, remain substantially motionless, whereas the steered wheels 4 are deflected in the direction of the respective steering intervention by a corresponding motion of the output part 2" relative to the input part 2'.

If both drives 6, 7 are available, the drive 12 is preferably only activated, when the steering is automatically driven, so that compensation is provided for the self-locking between the toothed ring 15 and the worm 17 and so that the drives 6, 7 can move the input part 2' and the output part 2" relative to one another with practically no reaction.

An intervention by the driver can be superimposed on the automatic steering intervention at any time by the driver actuating the steering wheel 1. This is because the setting motion of the output part 2" is always determined by the sum of the setting motions of the input part 2', or of the steering wheel 1 connected so as to rotate with it, and of the worm 17, or of the toothed ring 15 engaging therewith. If only one of the drives 6, 7 and 12 is still available, an automatic steering intervention is still possible in emergency operation.

If, for example, only the drive 6 or 7 is available, the steered wheels 4 can still be deflected in a motorized manner by this drive but the steering wheel 1 executes a correspondingly large motion, which the driver can, if necessary, restrict or prevent. If only the drive 12 is available, a steering deflection of the steered wheels 4 can be effected in a motorized manner by the drive 12 provided the driver holds the steering wheel 1 at rest—or possibly permits only relatively slow motions of the steering wheel 1.

If the control system 8 detects a serious malfunction, all the drives 6, 7 and 12 are immediately separated from their energy supply so that the steering system behaves like a conventional steering system without the possibility of an automatic steering intervention.

In all the embodiments previously described, the drives 6, 7, 10 and 12 are preferably configured as closed-loop drives which are actuated by the control system 8 in accordance with a comparison of required and actual values.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A control appliance, comprising a manually actuated handling device, control elements, a drive connection for operatively connecting the handling device and the control elements wherein the drive connection includes an input part and an output part, an automatically controllable motorized drive appliance selectively connectible to the control elements and operable to selectively actuate the control elements autonomously, wherein the drive appliance is operatively configured and arranged to one of actively adjust the output part and subject the outpart part to a torque and, only during an intervention in normal steering control, to overcome a self-locking device effecting a connection between the input part and the output part during the normal steering control, thereby to effect a disconnection of the input part from the output part during the intervention, which disconnection is otherwise prevented by the self-locking device when the drive appliance is separated from an associated energy supply during the normal steering control such that a permanently effective positive connection between the input part and the output part is selectively and effectively separated.

2. The control appliance according to claim 1, wherein the control appliance is a motor vehicle steering system, the handling device is a steering wheel, and the control elements are steered wheels.

3. The control appliance according to claim 1, wherein the permanently effective positive connection is a mechanical through-connection between the input part and the output part.

4. The control appliance according to claim 3, where a sliding clutch positively connects the input part and the output part, and the input part and the output part are each provided with a non-self-locking drive.

5. The control appliance according to claim 3, where a self-locking drive positively connects the input part and the output part, and at least one of the input part and the output part is provided with a non-self-locking drive.

6. The control appliance according to claim 5, where the self-locking drive is a travelling wave electric motor.

7. The control appliance according to claim 3, wherein a superimposed gear provided with two inputs and one output is arranged between the input part and the output part, one input of the superimposed gear being connected to the input part, the output being connected to the output part and the other input being movable, via a drive, relative to a stationary part of the appliance, the other input being held stationary by the self-locking nature of one of the drive, and gear parts connected thereto when the drive associated with the other input is separated from its energy supply, and the non-self-locking drive is operatively arranged on at least one of the input part and the output part (2").

* * * * *